(12) United States Patent
Schibsbye et al.

(10) Patent No.: US 11,415,105 B2
(45) Date of Patent: Aug. 16, 2022

(54) GANTRY-LESS WIND TURBINE WEB INSTALLATION WITH HEATING

(71) Applicant: TPI Composites, Inc., Warren, RI (US)

(72) Inventors: Karsten Schibsbye, Fredericia (DK); Amir Salimi, Providence, RI (US)

(73) Assignee: TPI Composites, Inc., Warren, RI (US)

( * ) Notice: Subject to any disclaimer, the term of this patent is extended or adjusted under 35 U.S.C. 154(b) by 328 days.

(21) Appl. No.: 16/660,281

(22) Filed: Oct. 22, 2019

(65) Prior Publication Data
US 2020/0124028 A1 Apr. 23, 2020

Related U.S. Application Data

(60) Provisional application No. 62/748,830, filed on Oct. 22, 2018.

(51) Int. Cl.
| | |
|---|---|
| *B23P 15/04* | (2006.01) |
| *F03D 13/10* | (2016.01) |
| *B29C 70/30* | (2006.01) |
| *B29C 70/68* | (2006.01) |
| *F03D 1/06* | (2006.01) |
| *B29L 31/08* | (2006.01) |

(52) U.S. Cl.
CPC .............. *F03D 13/10* (2016.05); *B23P 15/04* (2013.01); *B29C 70/30* (2013.01); *B29C 70/682* (2013.01); *F03D 1/0675* (2013.01); *B29L 2031/085* (2013.01); *F05B 2230/60* (2013.01); *F05B 2240/2211* (2013.01); *Y10T 29/49337* (2015.01); *Y10T 29/49339* (2015.01)

(58) Field of Classification Search
CPC ....... F03D 13/10; F03D 1/0675; B29C 70/30; B29C 70/682; B29L 2031/085; F05B 2230/60; F05B 2240/2211; Y02E 10/72; Y02P 70/50; B29D 99/0028; B23P 15/04; Y10T 29/4932; Y10T 29/4936; Y10T 29/4937; Y10T 29/4939; Y10T 29/49341; Y10T 29/49343

See application file for complete search history.

(56) References Cited

U.S. PATENT DOCUMENTS

| | | |
|---|---|---|
| 8,382,440 B2 | 2/2013 | Baker et al. |
| 8,617,338 B2 | 12/2013 | Borsting et al. |
| 8,828,172 B2 | 9/2014 | Overgaard |

(Continued)

OTHER PUBLICATIONS

International Search Report and Written Opinion for International Application No. PCT/US19/57411 dated Jan. 9, 2020.

*Primary Examiner* — Sarang Afzali
(74) *Attorney, Agent, or Firm* — Stephen J. Kenny; Vincenzo DiMonaco; Foley Hoag LLP

(57) ABSTRACT

A method of forming a wind turbine blade is provided which includes upper and lower blade mold halves, and a shear web having at least one aperture formed therein. A plurality of bulkheads are attached to the shear web and the shear web can be lifted and rotated, without need for a complex gantry/galactica apparatus, to be placed inside the lower blade mold. The upper mold half can then be closed with the shear web and bulkhead(s) disposed within the blade interior. A heating fluid can be pumped into the interior to pass through the bulkheads, circulating around the shear web and exiting the blade root with the assistance of a sump to pull the cold air outside the blade.

19 Claims, 10 Drawing Sheets

(56) References Cited

U.S. PATENT DOCUMENTS

| | | | |
|---|---|---|---|
| 9,169,830 B2 | 10/2015 | Weitkamp et al. | |
| 9,470,205 B2 | 10/2016 | Liu et al. | |
| 10,544,776 B2 * | 1/2020 | Danielsen | F03D 1/0675 |
| 2010/0122459 A1 * | 5/2010 | Suffield | B29C 41/04 |
| | | | 29/889.7 |
| 2011/0091326 A1 * | 4/2011 | Hancock | F03D 1/0675 |
| | | | 416/225 |
| 2011/0262283 A1 * | 10/2011 | Hancock | B29C 65/483 |
| | | | 416/226 |
| 2013/0189114 A1 * | 7/2013 | Jenzewski | F03D 1/0675 |
| | | | 416/229 R |
| 2013/0336789 A1 | 12/2013 | Berg | |
| 2015/0010405 A1 * | 1/2015 | De Waal Malefijt | B23P 15/04 |
| | | | 416/229 R |
| 2015/0267680 A1 | 9/2015 | Saini et al. | |
| 2017/0151711 A1 | 6/2017 | Birkemose et al. | |

\* cited by examiner

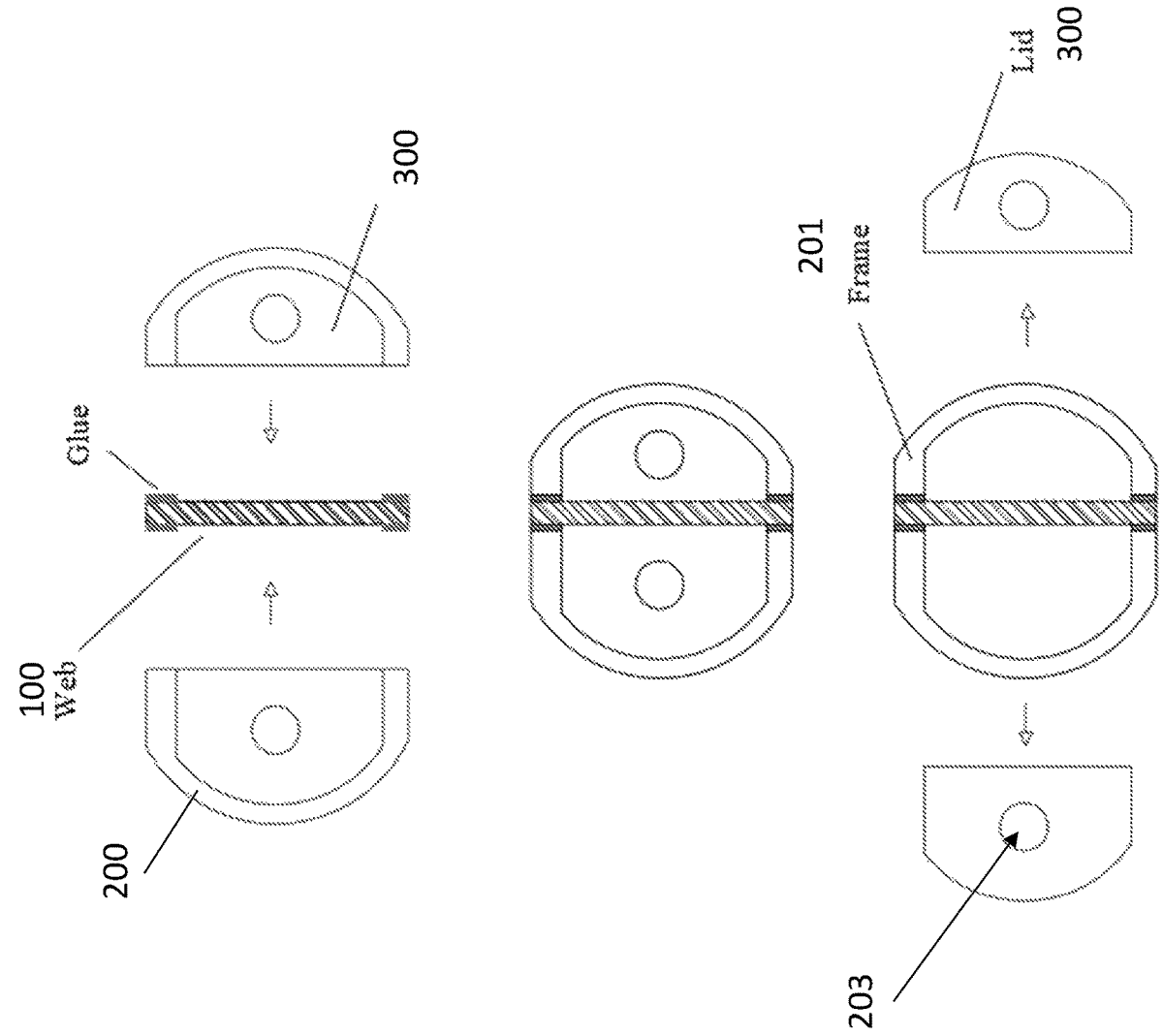

GANTRY-LESS WIND TURBINE WEB INSTALLATION WITH HEATING

CROSS REFERENCE TO RELATED APPLICATIONS

This application claims the benefit of priority under 35 USC 119 to Provisional application No. 62/748,830 filed Oct. 22, 2018, the entire contents of which are hereby incorporated by reference.

BACKGROUND OF THE DISCLOSED SUBJECT MATTER

Field of the Disclosed Subject Matter

The disclosed subject matter relates to a system, and corresponding method, of manufacturing large scale composite structures, e.g. wind turbine blades. These large scale composite structures are typically formed from a two-piece mold and shear web insert which, once the blade halves are molded, requires a complex mold installation and closure processes, including an overhead gantry apparatus for transporting and positioning the shear web in order to complete fabrication.

Particularly, the present disclosure provides a system and corresponding method of shear web installation, without requiring a gantry to support the shear web, by employing support elements in the shear web which serve as an installation guide while also ensuring stability of the web after installation.

Description of Related Art

Wind turbine blades generally comprise a hollow blade shell made primarily of composite materials, such as glass-fiber reinforced plastic. The blade shell is typically made up of two half shells, a lower pressure-side shell and an upper suction-side shell, which are molded separately in respective female half molds, before being bonded together along flanges at the leading and trailing edges of the blade. This method of manufacturing a blade is illustrated schematically in FIG. 1a.

Referring to FIG. 1a, this shows a mold 10 for a wind turbine blade divided into two half molds, an upper suction-side mold 10a and a lower pressure-side mold 10b, which are arranged side by side in an open configuration of the mold. A pressure side blade shell 12a is supported on a mold surface 14a of the lower mold 10a and a suction side blade shell 12b is supported on a mold surface 14b of the upper mold 10b. The shells 12a, 12b are each made up of a plurality of glass-fiber fabric layers, which are bonded together by cured resin.

After forming the shells 12a, 12b in the respective mold halves 10a, 10b, shear web(s) 16 are bonded to an inner surface 17 of the windward blade shell 12a. Although two shear webs are depicted in FIGS. 1A-1C, the present disclosure includes the use of a single shear web. Indeed, single shear web embodiments can be less stable than dual web designs, thus the present disclosure has even greater utility for single web embodiments. As shown, the shear webs 16 are longitudinally-extending structures that bridge the two half shells 12a, 12b of the blade and serve to transfer shear loads from the blade to the wind turbine hub in use. In cross-section, as shown in FIG. 1a, the shear webs 16 each comprise a web 18 having a lower edge 19 comprising a first longitudinally-extending mounting flange 20 and an upper edge 21 comprising a second longitudinally-extending mounting flange 22. Adhesive such as epoxy is applied along these mounting flanges 22 in order to bond the shear webs 16 to the respective half shells 12a, 12b.

As shown in FIG. 1b, once the shear webs 16 have been bonded to the upper blade shell 12a, adhesive is applied along the second (upper) mounting flanges 22 of the shear webs 16, and along the leading edge 24 and trailing edge 26 of the blade shells 12a, 12b. The upper mold 10b, including the upper blade shell 12b, is then lifted, turned and placed on top of the lower blade mold 10a in order to bond the two blade half shells 12a, 12b together along the leading and trailing edges 24, 26 and to bond the shear webs 16 to an inner surface 28 of the upper blade shell 12b. The step of placing one mold half on top of the other is referred to as closing the mold.

Referring now to FIG. 1C, a problem can arise when the mold 10 is closed whereby the shear webs 16 may move slightly relative to the upper shell 12b. For example, the shear webs 16 may move slightly under their own weight during mold closing or they may be dislodged by contact with the upper shell 12b. The concave curvature of the upper shell 12b also has a tendency to force the shear webs 16 together slightly, as shown in FIG. 1C. Such movement of the shear webs 16 during mold closing may result in the shear webs 16 being bonded to the upper shell 12b at a sub-optimal position.

Additionally, conventional process to install a shear web in the mold use a complex installation fixture, e.g. overhead gantry. The large size and weight of the gantry fixture often creates complications with respect to shop floor real estate, and operating the gantry fixture presents a significant delay in manufacture cycle time.

Furthermore, there are various techniques which require employing permanent fixtures to guide the shear webs during mold closure. An example of which is provided in U.S. Patent Publication No. 2017/0151711, the contents of which are hereby incorporated in its entirety, including the web guide structures. However, use of such permanent fixtures adversely impact the blade weight, as well as increasing design complexity and costs, impacting the designed structure of the blade by becoming parasitic to blade structure in use. Moreover, the prior methods had to be part of the initial blade design.

There thus remains a need for an efficient and economic method and system for providing support for the webs/structure elements during the assembly phase of wind turbine devices that ensure proper placement of the shear web, without requiring a gantry fixture, and without impacting the structure of the product.

In accordance with the present disclosure, a novel system is provided for handling the shear web and establishing a gantry-less installation process.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method of forming a wind turbine blade, comprising: providing a first blade half; providing a second blade half; providing a shear web, the shear web including at least one aperture formed therein; providing at least one bulkhead, the at least one bulkhead attached to the shear web; placing the shear web and at least one bulkhead on the first blade half; disposing the second blade half on the first blade half to define a blade interior therebetween, the shear web and at least one bulkhead disposed within the blade interior.

In some embodiments, a first bulkhead includes first and second symmetrical components, the first component disposed on first side of the shear web and the second bulkhead disposed on first side of the shear web. For example, the first and second symmetrical components can be configured in a generally D-shape geometry.

In some embodiments, a second bulkhead includes first and second asymmetrical components, the first component disposed on first side of the shear web and the second bulkhead disposed on first side of the shear web.

In some embodiments, the first component of the second bulkhead is configured in a generally D-shape geometry and the second component of the second bulkhead is configured with a tapered geometry.

In some embodiments, a first bulkhead is located proximate the root of the blade and a second bulkhead is located a predetermined distance from the first bulkhead.

In some embodiments, placing the shear web and bulkhead(s) on the first blade half includes rotating the shear web from a horizontal to vertical orientation.

In some embodiments, the method also includes removing at least one lid from a bulkhead to expose the interior of the blade.

In some embodiments, the method also includes heating and/or cooling the interior of the blade.

In accordance with another aspect of the disclosure, a method of forming a wind turbine blade is provided which comprises: providing a first blade half; providing a second blade half; providing a shear web, the shear web including at least one aperture formed therein; providing at least one bulkhead, the at least one bulkhead attached to the shear web; placing the shear web and at least one bulkhead on the first blade half; disposing the second blade half on the first blade half to define a blade interior therebetween, the shear web and at least one bulkhead disposed within the blade interior; heating the interior of the blade, wherein heating includes directing fluid from the blade root through a bulkhead towards the blade tip with the fluid circulating around the shear web.

In some embodiments, heating includes pumping fluid through an aperture on a first side of the shear web.

In some embodiments, heating includes suctioning fluid through an aperture on a second side of the shear web.

In some embodiments, heating includes directing fluid around the distal end of the shear web proximate the blade tip.

In some embodiments, heating includes directing fluid around the shear web at a location between the root and tip.

In some embodiments, a first bulkhead includes a first aperture for fluid passage located therein, and a second bulkhead includes a second aperture for fluid passage located therein, the first aperture offset in a chordwise direction from the second aperture.

In some embodiments the method also includes removing at least one lid from the second blade half to expose at least one bulkhead disposed in the interior of the blade.

In some embodiments the method also includes performing a layup operation after removal of the at least one lid.

In some embodiments, heating includes simultaneously pumping heated fluid at the blade root and suctioning cold fluid at the blade root.

In some embodiments, heating includes routing conduits for distributing the heated fluid through the bulkheads.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 2-4 are schematic representations of a bulkhead and shear web assembly.

DETAILED DESCRIPTION OF AN EXEMPLARY EMBODIMENT

Figure 1A:
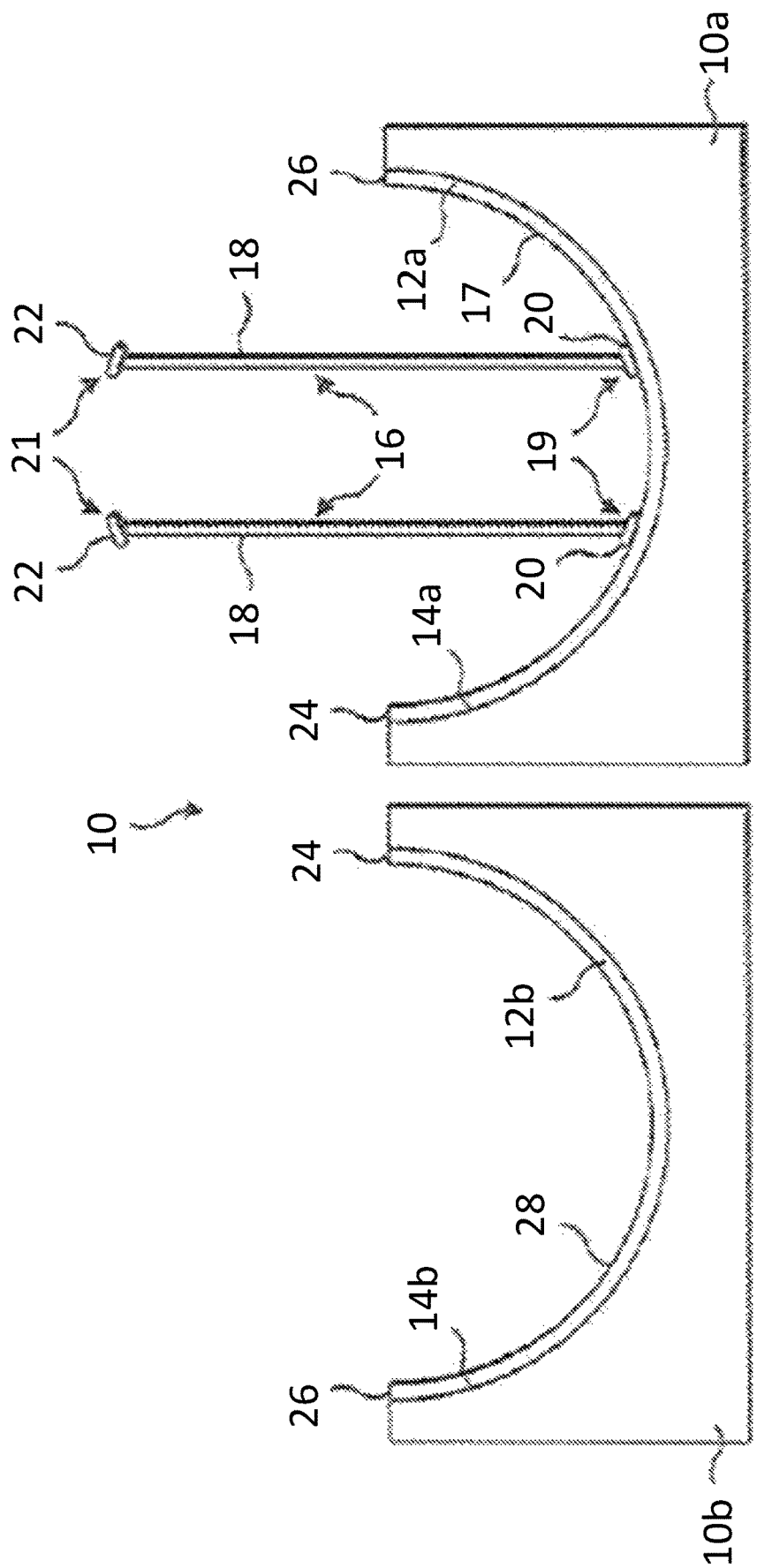
FIGS. 1A-C depict cross-sectional views of a conventional wind turbine blade mold and manufacturing method.
Figure 1B:
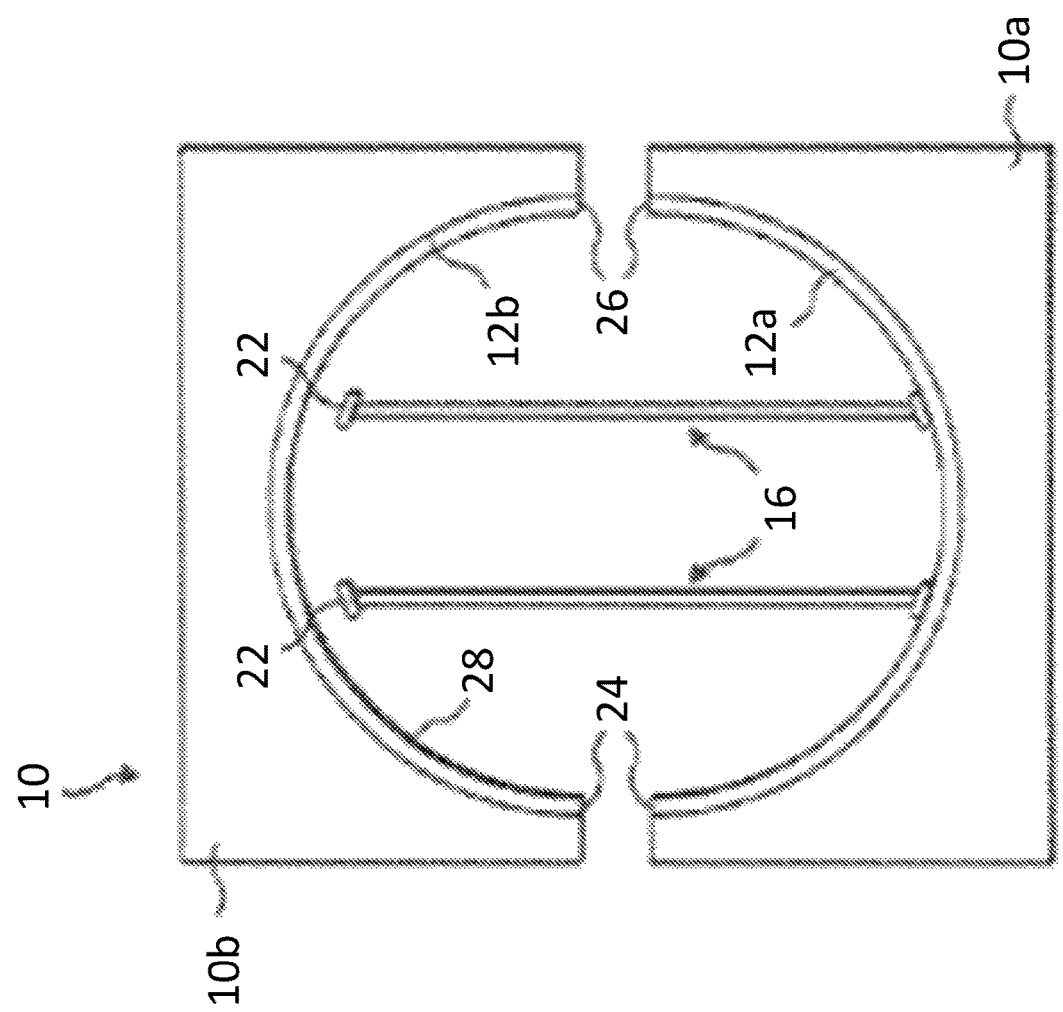
Figure 1C:
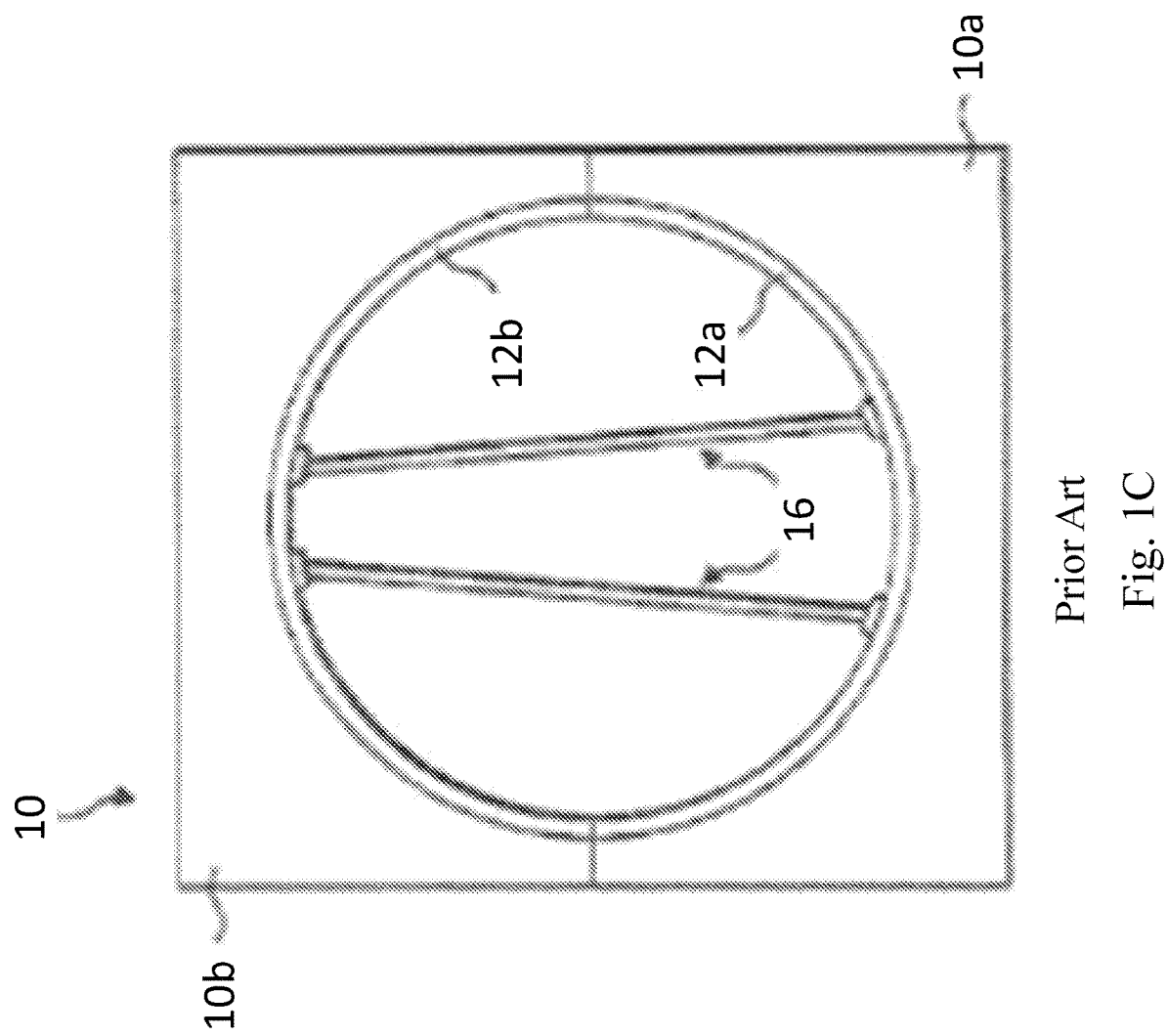

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for large structure construction. The disclosed subject matter is particularly suited for construction of wind turbine blades. For purpose of explanation and illustration, and not limitation, an exemplary embodiment of the system in accordance with the disclosed subject matter is shown in FIGS. 1A-8 and is designated generally by reference character 1000. Similar reference numerals (differentiated by the leading numeral) may be provided among the various views and Figures presented herein to denote functionally corresponding, but not necessarily identical structures.

Figure 3:
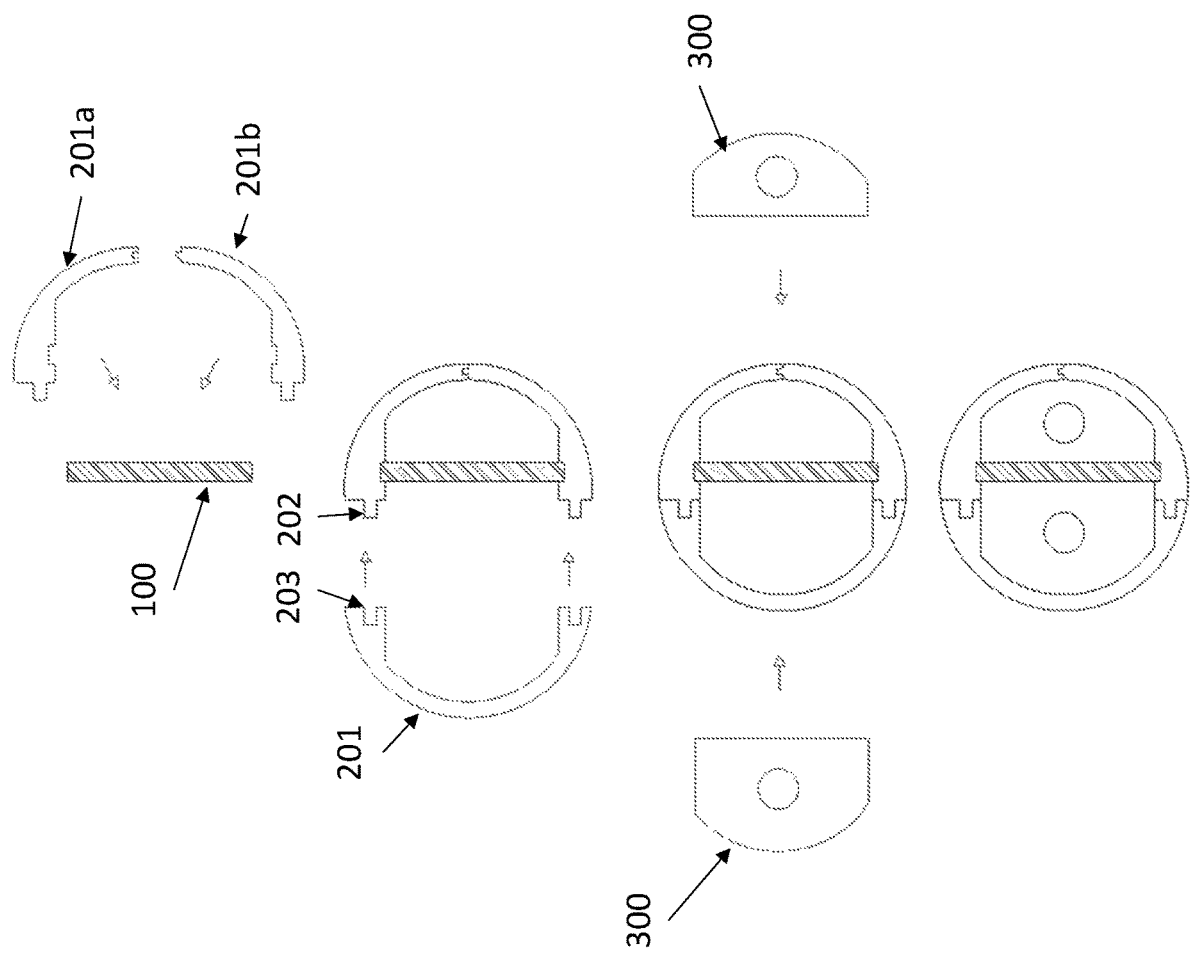

As shown in FIG. 2, the present disclosure includes a plurality of bulkheads 200, 204 for use in connection with a shear web 100. The bulkheads 200 include a removable lid 300 which can be detached from the frame of the bulkhead, to permit access to the interior of the blade. The frame 201 of the bulkheads can remain attached to the interior surface of the blade while the lids are removed, as shown. The bulkhead frame can be formed as a unitary piece (such as the generally semi-circular unit as sown in FIG. 3), and/or as a multicomponent structure that is assembled together to form a generally semi-circular unit (such as first half 201a and second half 201b as shown in FIG. 3).

Figure 4:
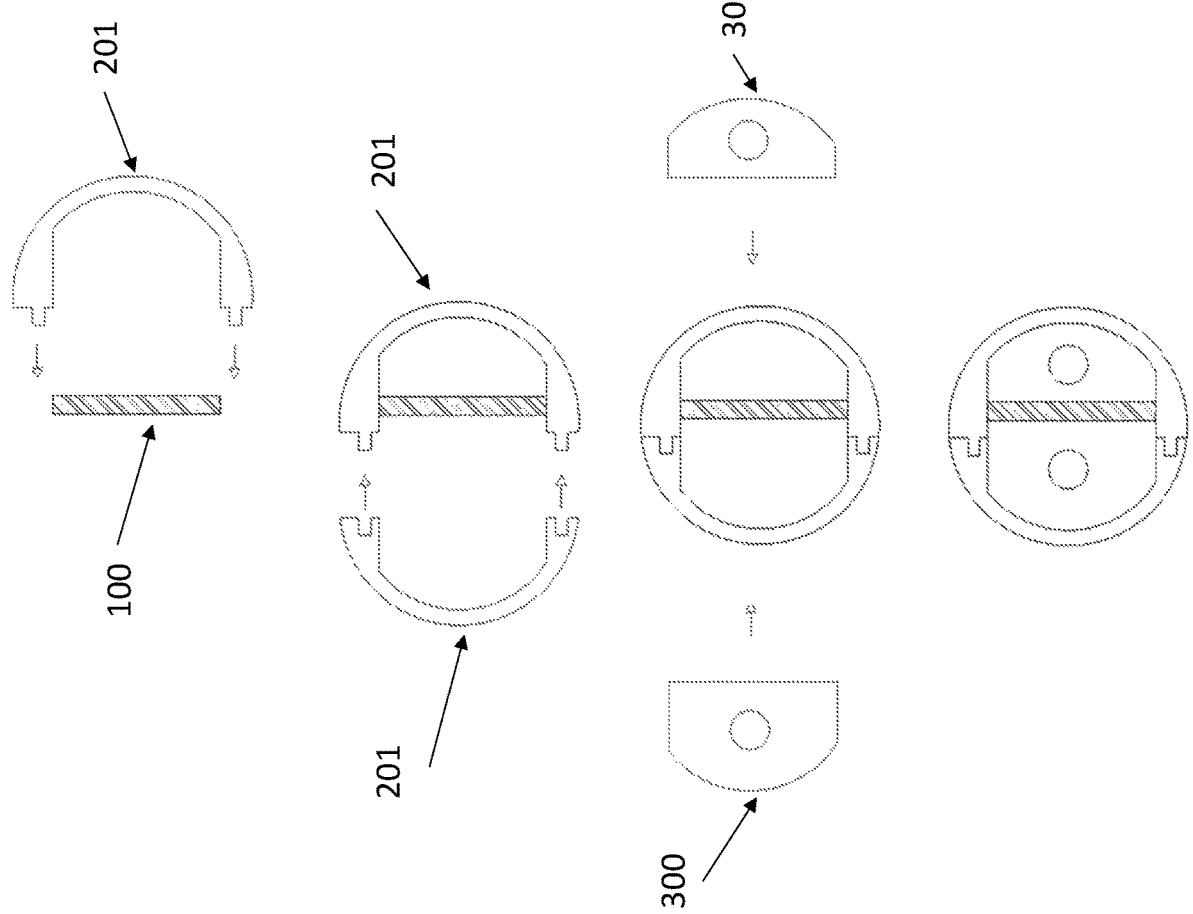

In some embodiments the union of the multi-component frames 201a, 201b is located offset from the portion of the frame that engages the shear web 100, as shown. For example, frame subcomponent 201a can be joined to frame subcomponent 201b at a location that coincides with a leading and/or trailing edge of the blade. In some embodiments, the bulkheads can be assembled with a combination of frame types (e.g. unitary frame 201 on a first side of the shear web 100, and a multi-component frame 201a, 201b on a second side of the shear web 100—as shown in FIG. 3). In some embodiments, the bulkhead can be formed from two frame sections 201 that are joined at locations coinciding with the upper and lower skin surfaces of the blade, as shown in FIG. 4. Frames, and any subcomponents thereof, can include a male 202 and female 203 union, such as a tongue and groove mating. Additionally, the frames 201 can be sized with an interior surface that is generally arcuate along the sides and generally planar along the tops and bottoms, as shown. The planar tops/bottoms facilitates bonding with the planar surface of the shear web 100. The lid 300 can be attached to the frame after the frame parts 201a, 201b are assembled together.

In some embodiments, an adhesive (e.g. glue) is applied at the top and bottom edges of the shear web 100 for bonding with the bulkhead frames (i.e. the remainder of the shear web surface does not receive any adhesive, such that the lids 300 can be removable). In some embodiments, the bulkheads 200 have generally D-shape, though alternative geometries are included within the scope of this disclosure. Similarly, in some embodiments the bulkhead located between the shear web and the lower/pressure side of the blade is symmetrical with the bulkhead located between the shear web and the upper/suction side of the blade. Alternatively, in some embodiments the bulkhead located between the shear web and the lower/pressure side of the blade is asymmetrical with the bulkhead located between the shear web and the upper/suction side of the blade, though alternative geometries are included within the scope of this disclosure.

Figure 5:
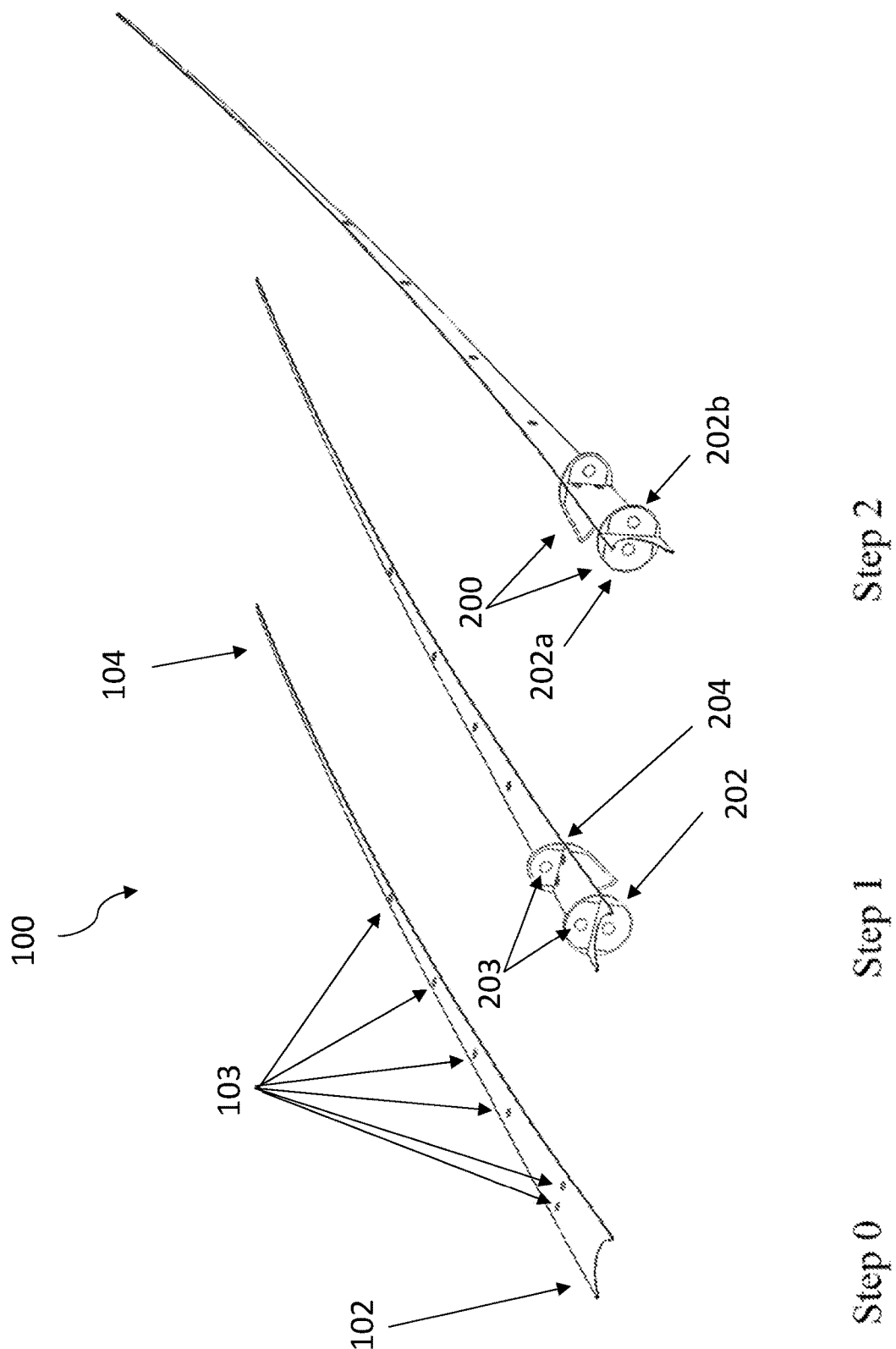
FIG. 5 is a schematic representation of a shear web (Step 0), with attached support bulkheads (Step 1) and rotated (Step 2) for installation in a wind turbine blade mold, in accordance with an embodiment of the present disclosure.

As shown in FIG. 5, shear web 100 is provided initially laid down on its side in the horizontal position as shown in Step 0. Note, although the geometry of the exemplary shear web 100 is shown having a tapered configuration from root 102 to tip 104, the present disclosure is equally applicable to shear webs of any shape/size. A plurality of apertures 103 are formed in the shear web to permit fluid (e.g. air) to pass through the cross section of the shear web. As the thickness of the blade tends to be greater proximate the root, there is a greater need for heating to cure the additional materials. Accordingly, an embodiment of the present disclosure includes a greater number (e.g. two) of apertures 103 formed in the web proximate the root 102 as compared to the number (e.g. one) of apertures 103 formed in the web proximate the tip 104. These apertures accelerate heating/curing and reduce/eliminate stagnation of the flow of the heating fluid during a cure cycle. In the embodiment shown, two apertures 103 are formed in the root area while additional and apertures can be formed in the span wise direction. In some instances the size and frequency of the apertures can vary with the shear web dimensions and location (e.g. more apertures, larger size, proximate the root with less apertures of smaller size proximate the tip). As previously noted, these apertures 103 serve as air passages in the body of shear web to enable circulation of air in the root area where the thickness of infusion resin system and adhesive material are significant and to void stagnation of air flow in the tip area.

While the web is in horizontal orientation, supports or bulkheads 200 are installed in the shear web 100, as shown in Step 1. In this exemplary embodiment, the bulkheads 200 are attached to the shear web at specific meter marks of the web span. In some embodiments the bulkheads are positioned a fixed distance from each other, whereas in other embodiments the spacing can vary along the blade span. In some embodiments the bulkheads are positioned proximate the root section, where the blade is heavier and taller (i.e. greater sized opening). As shown, a first bulkhead 202 is positioned proximate the root of the blade and formed with two generally D-shaped members (as best shown in FIG. 2), one disposed on each side of the shear web 100. A second bulkhead 204 is positioned distal of the first bulkhead 202 and formed with one generally D-shaped member on a first side and a tapered shape member on the second side (as best shown in FIG. 3). In the exemplary embodiment shown, the taper can be asymmetrical with a top portion of the bulkhead 204 slanted downward at a greater angle than the bottom portion is slanted upward. Alternatively, the taper can be formed symmetrically with upper and lower surfaces equally angled with respect to the central axis of the bulkhead. The degree of taper varies in accordance with the contour of the blade such that the bulkhead shape compliments the varying blade thickness and/or camber wherever the bulkhead(s) is positioned along the blade span. The bulkheads also include apertures or conduits 203 for receiving piping of fluid, e.g. air, circulation throughout the span of the blade, as described in further detail below.

Although the exemplary embodiment depicts two bulkheads 202, 204 disposed on the leading and trailing sides of the shear web 100, additional and non-uniform bulkheads can be attached to the shear web. For example, in some instances the size and frequency of the bulkheads can vary with the shear web dimensions and location (e.g. more bulkheads, of larger size, proximate the root with less bulkheads of smaller size proximate the tip). The bulkheads proximate the root can extend a greater distance (or "height") from the shear web 100 than bulkheads proximate the tip. Accordingly, the bulkheads can be configured with a gradual reduction in height along the blade span to coincide with the reduction in blade thickness and/or camber.

As described above, the bulkheads 200 can have a generally planar side configured for engaging the shear web 100, and an opposing arcuate side configured for engagement with the blade skin. In some embodiments each bulkhead is configured as a multi-component structure with a first bulkhead 202a attached to a first side (e.g. leading edge side) of the shear web, and a second bulkhead 202b attached to a second side (e.g. trailing edge side) of the shear web, as shown in FIG. 3. In such multi-component configurations, the bulkheads 202, 204 can be separated by the shear web 100 such that there are no interconnecting parts between the bulkheads 202a, 202b and each bulkhead can be installed/removed/repositioned independent of the other. In some embodiments, the two bulkheads 202a, 202b can have an interlocking feature that secures the two bulkheads together (with the shear web 100 remaining therebetween).

The bulkheads 200 can be secured to the shear web with a variety of attachment means including adhesive or mechanical union (e.g. screws, rivets, etc.) as well as frictional forces via interference fit. Once the bulkheads 200 are attached to the shear web 100, the shear web can be lifted and rotated into a vertical orientation, as shown in Step 2. This operation can be performed with an overhead lift device, e.g. crane, and does not require the complex and cumbersome gantry apparatus (which extends along the length of the web). The shear web 100, with attached bulkheads 200, is then installed into the blade skin mold, as shown in Step 3 of FIG. 6, using the same overhead lift device employed for Step 2.

As bulkheads 200 are precisely shaped to match the surface of the blade, the shear web 100 can be installed in its final position inside the blade mold by simply lowering and releasing the shear web 100 (with attached bulkheads 200) in the correct span wise location (Step 3). The bulkheads 200 can serve as visual confirmation that the shear web 100 is properly positioned. For example, markings (optical: laser projection, or physical lines) can be provided within the blade skin to coincide with the edge of the bulkheads, when properly positioned.

Once positioned in the correct alignment, the second half of the mold is closed on top of the first mold half (with the shear web 100 positioned inside), as shown in Step 4. Next, select portions, or lids 300, can be removed from the bulkhead(s) to allow technicians to have access to blade's interior (Step 5) to permit subsequent manufacturing operations, e.g. hand layup of composite segments. In the exemplary embodiment shown, two lids 302, 304 are removable from the mold and are disposed proximate the root section. In the open, or removed configuration shown in Step 5, the shear web 100 is accessible as are the bulkhead frames 202, 204. In the depiction of Step 5 in FIG. 6, the two segments of the upper blade surface are shown as removed from the remainder of the skin surface for purpose of illustration only of the underlying bulkhead/web configuration; in operation, the surface of the blade remains contiguous. In some embodiments, one or more bulkhead lids can be removed from the blade and positioned outside the blade, with the bulkhead frames remaining attached inside the blade (as shown in Step 5), to facilitate internal access.

Figure 6:
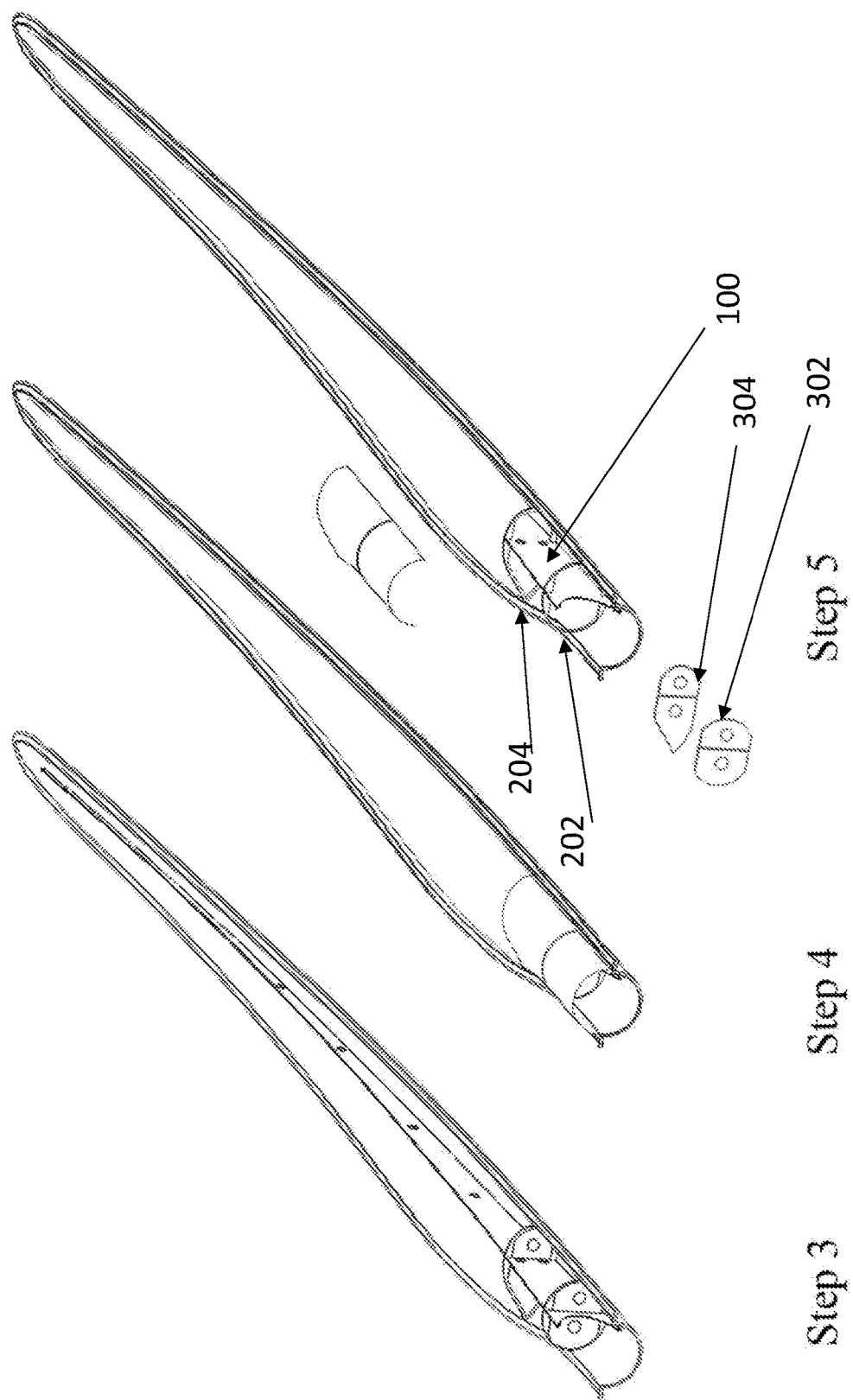
FIG. 6 is schematic representation of a shear web disposed in an open mold half (Step 3), closed configuration (Step 4) and with the support bulkheads removed (Step 5), in accordance with an embodiment of the present disclosure.
Figure 7:
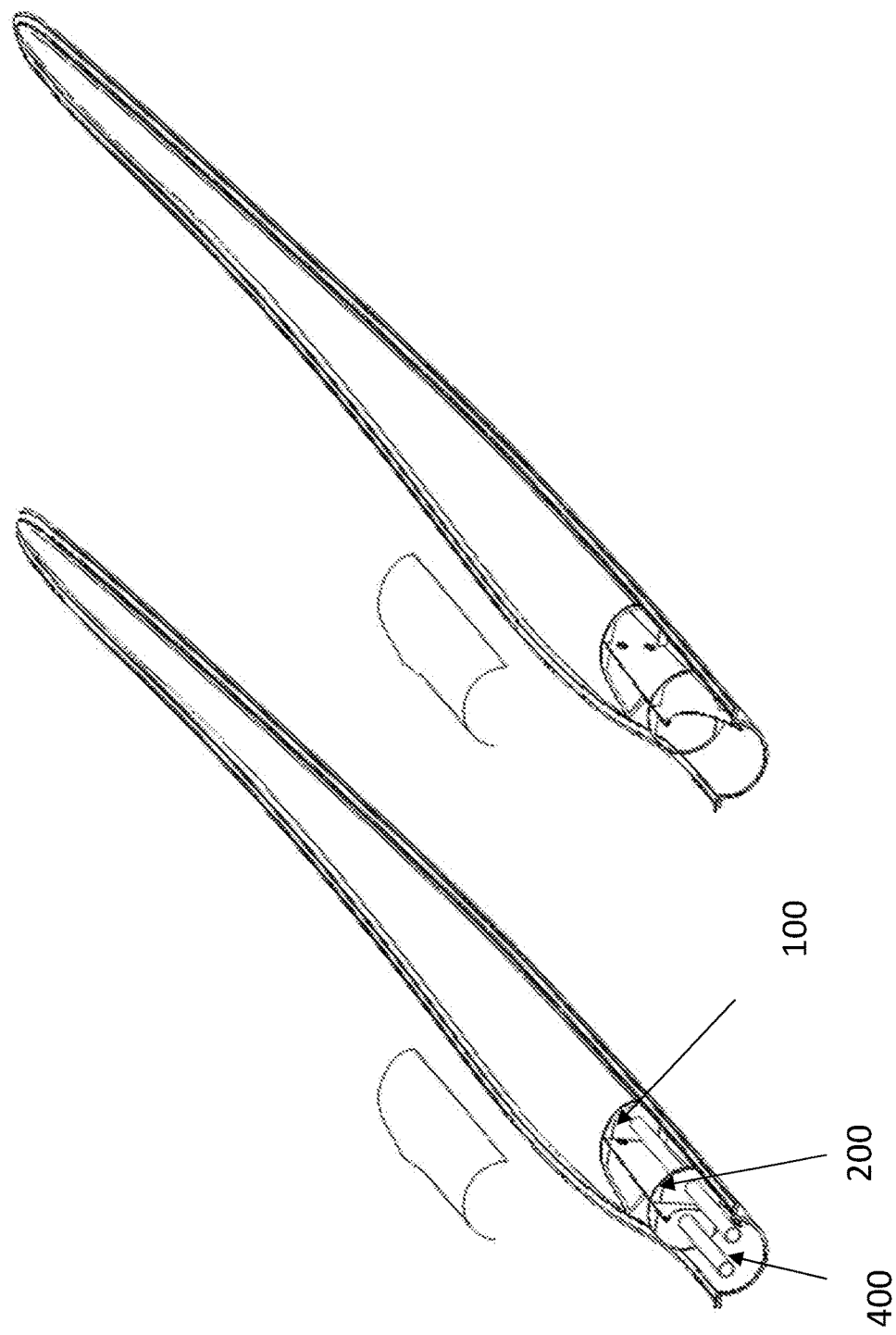
FIG. 7 is schematic representation of a shear web disposed in mold and attached to HVAC passages (Step 6), and with HVAC passages removed (Step 7), in accordance with an embodiment of the present disclosure.

Once the subsequent manufacturing operations, e.g. hand layup of composite segments is finished, lids 300 are placed back on the bulkheads 200 and a heating system is attached to the fluid, e.g. air, passages that are built in to the lids, as shown in Step 6 of FIG. 7. Although the exemplary embodiment described focuses on air circulation for heating of the turbine, the apparatus and method disclosed herein is equally applicable to cooling of the blade as well. After the heating/cooling operation (described in more detail below) is performed to the desired level of cure, the lids 300 can again be removed from the bulkheads 200 for completion of the blade and subsequent installation in the field. The removability of the lids 300 is advantageous here in that it reduces blade weight and any corresponding performance impact. As previously noted, the bulkhead frames can remain permanently attached to the interior blade surfaces. In accordance with another aspect of the disclosure, a heating system and method that accelerates the cure process of the closed mold is provided, an exemplary schematic of which is shown in FIG. 6. Attempting to provide a heating system by attaching to the root close-out and pumping heat inside the closed blade interior does not allow for effective penetration of hot air and stagnation happens fairly close to the root of the blade.

Figure 8:
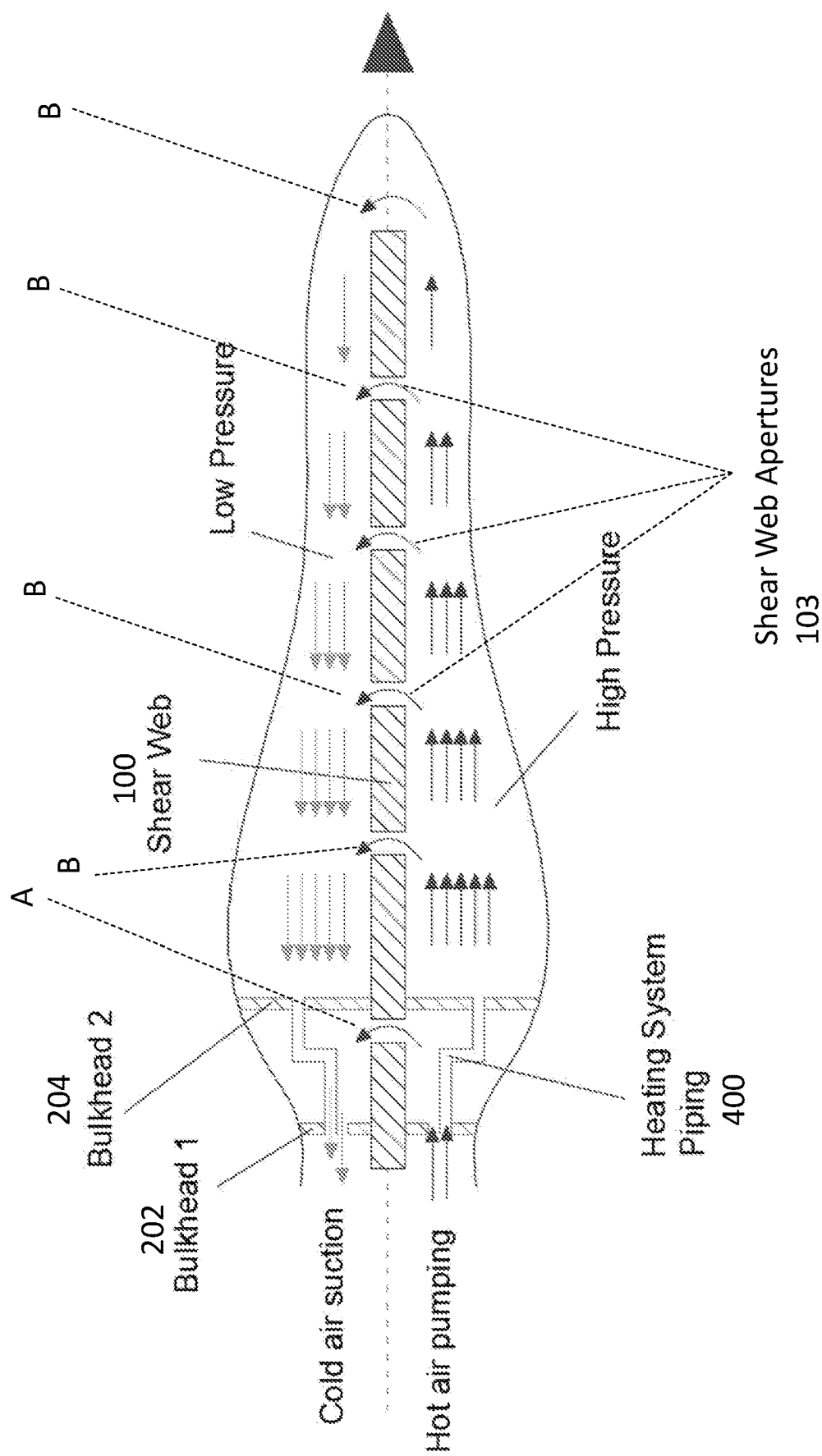
FIG. 8 is schematic representation of an exemplary air flow pattern within the blade mold, in accordance with an embodiment of the present disclosure.

As FIG. 8 shows, in the presently disclosed system, the interior of the blade is divided into two (e.g. root and tip) spaces using the bulkheads 200 and their corresponding piping system. The bulkhead apertures 203 and corresponding piping can be positioned and aimed such that the airflow does not directly impinge on the blade surfaces. Circulating the hot air in each of these cells separately improve the efficiency of the heating process. In some embodiments, a suction unit can be included on the opposite side (lower side of FIG. 6) of the pumping system which ensures the smooth flow of air within both heating cells. Additionally, the location of pumping and suction units can be exchanged at the middle of the process in order to obtain a uniform degree of cure in both side of the blade.

The hot air can be directed through the first bulkhead 202, through the apertures 103 in the shear web and back through the first bulkhead 202, so as to wrap around the shear web proximate the blade root. This establishes a first circulation zone denoted by arrow "A" in FIG. 6. While traversing this path the air loses temperature via conduction and convection to the neighboring components which expedites curing. After wrapping around the shear web the air is pulled toward the root via the cold suction apparatus again traversing through the first and second bulkheads.

Additionally, the hot air can be directed, via conduits/piping 400 through the first bulkhead 202 and dispensed at the second bulkhead 204, through the apertures 103 spaced along the remainder of the shear web span, and back through the second bulkhead 204 where it can be again piped/sucked through the first bulkhead 202. This establishes a second circulation zone denoted by arrow "B" in FIG. 6, which again wraps around the shear web along a greater distance of the blade span than circulation zone "A". This circulation zone "B" can include an air passageway between the end of the shear web and the tip of the blade.

In some embodiments the heating/pumping operation is run independently of the cooling/suction operation. In some embodiments the heating/pumping operation is run simultaneously with the cooling/suction operation. Additionally or alternatively, both the heating/pumping operation and cooling/suction operation can be run on a continuous basis or on an intermittent basis with pre-programmed start/stop times and/or process milestones (e.g. detecting that the skin surface temperature has reached a threshold value).

In accordance with an aspect of the disclosure, once the cure process is completed, the heating system as well as lids 300 can be removed from the blade. The blade can proceed (and be transported if necessary) to a finishing bay while the bulkhead frames (with no lids) remain attached to it permanently. Additionally or alternatively, the bulkheads can be removed, if so desired.

Accordingly, the system and method disclosed herein provide multiple advantages including
1. Eliminates the demands/restraints on shop floor space due to storing conventional large gantry fixtures for movement of the shear web.
2. Accelerates web installation process and shortens the production cycle time.
3. Avoids resource sharing and crane usage limitations as molds in each production section share same fixtures.

4. Provides significant savings in capital expenditures for launch of a new blade design (e.g. does not require sunk costs associated with gantry fixture)
5. Accelerates the cure process and shortens the production cycle time.
6. Bulkhead frames stay in the blade (very insignificant weight and no impact on structural integrity of the blade structure) needs approval from OEM's.
7. Avoids the need to create an air passage on the Shear Web.

Furthermore, the system and method disclosed herein provides a technique for stabilizing the web during installation; enables a one-step closure of the two mold halves such that the shear web can be bonded and cured simultaneously to both mold skins; and ensures the correct position and orientation of the shear web such that there is no need for locating fixtures nor a gantry system for supporting the web.

Although only a single shear web 100 is depicted in the exemplary embodiment, additional shear webs can be employed within the scope of the present disclosure. Furthermore, although the shear web 100 is depicted as an I-beam construction, alternative shear web configurations can be employed, e.g. split beams having generally a U-shape or V-shape construction, if so desired.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A method of forming a wind turbine blade, the method comprising:
   providing a first blade half;
   providing a second blade half;
   providing a shear web, the shear web including at least one aperture formed therein;
   providing at least one bulkhead, the at least one bulkhead attached to the shear web;
   placing the shear web and the at least one bulkhead on the first blade half;
   disposing the second blade half on the first blade half to define a blade interior therebetween, the shear web and the at least one bulkhead disposed within the blade interior; and
   wherein the at least one bulkhead includes a frame and a removable lid.

2. The method of claim 1, wherein a first bulkhead includes first and second asymmetrical components, the first component disposed on a first side of the shear web and the second bulkhead disposed on a first side of the shear web.

3. The method of claim 2, wherein the first and second asymmetrical components are configured in a D-shape geometry.

4. The method of claim 1, wherein the frame remains permanently attached to the shear web.

5. The method of claim 1, wherein a first bulkhead of the at least one bulkhead is located proximate a root of the blade and a second bulkhead of the at least one bulkhead is located a predetermined distance from the first bulkhead.

6. The method of claim 1, wherein placing the shear web and at least one bulkhead on the first blade half includes rotating the shear web from a horizontal to a vertical orientation.

7. The method of claim 1, further comprising removing at least one removable lid from the at least one bulkhead to expose the interior of the blade.

8. The method of claim 1, further comprising heating the interior of the blade.

9. The method of claim 1, further comprising cooling the interior of the blade.

10. A method of forming a wind turbine blade, the method comprising:
    providing a first blade half;
    providing a second blade half;
    providing a shear web, the shear web including at least one aperture formed therein;
    providing at least one bulkhead, the at least one bulkhead attached to the shear web;
    placing the shear web and the at least one bulkhead on the first blade half;
    disposing the second blade half on the first blade half to define a blade interior therebetween, the shear web and the at least one bulkhead disposed within the blade interior; and
    heating the interior of the blade, wherein heating includes directing fluid from a root of the blade through the at least one bulkhead towards a tip of the blade with the fluid circulating around the shear web.

11. The method of claim 10, further comprising removing at least one lid from the at least one bulkhead to expose the interior of the blade.

12. The method of claim 11, further comprising performing a layup operation after removal of the at least one lid.

13. The method of claim 10, wherein heating includes pumping fluid through an aperture on a first side of the shear web.

14. The method of claim 10, wherein heating includes suctioning fluid through an aperture on a second side of the shear web.

15. The method of claim 10, wherein heating includes directing fluid around a distal end of the shear web proximate the blade tip.

16. The method of claim 10, wherein heating includes directing fluid around the shear web at a location between the root and the tip.

17. The method of claim 10, wherein a first bulkhead includes a first aperture for fluid passage located therein, and a second bulkhead includes a second aperture for fluid passage located therein, the first aperture being offset in a chordwise direction from the second aperture.

18. The method of claim 10, wherein heating includes simultaneously pumping heated fluid at a blade root and suctioning cold fluid at the blade root.

19. The method of claim 10, wherein heating includes routing conduits for distributing the heated fluid through the at least one bulkhead.

\* \* \* \* \*